United States Patent
Ashworth et al.

(10) Patent No.: US 10,294,109 B2
(45) Date of Patent: May 21, 2019

(54) PRIMARY DISTILLATION BORON REDUCTION

(71) Applicants: Mitsubishi Polycrystalline Silicon America Corporation (MIPSA), Theodore, AL (US); MITSUBISHI MATERIALS CORPORATION, Tokyo (JP)

(72) Inventors: April Ashworth, Mobile, AL (US); Michael W. Keevan, Theodore, AL (US)

(73) Assignees: MITSUBISHI POLYCRYSTALLINE SILICON AMERICA CORPORATION (MIPSA), Theodore, AL (US); MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/872,309

(22) Filed: Jan. 16, 2018

(65) Prior Publication Data

US 2018/0141819 A1 May 24, 2018

Related U.S. Application Data

(62) Division of application No. 14/556,640, filed on Dec. 1, 2014, now abandoned.

(51) Int. Cl.
*C01B 33/039* (2006.01)
*C01B 33/021* (2006.01)
*C01B 33/035* (2006.01)
*C01B 33/107* (2006.01)

(52) U.S. Cl.
CPC .......... *C01B 33/039* (2013.01); *C01B 33/021* (2013.01); *C01B 33/035* (2013.01); *C01B 33/10763* (2013.01); *C01B 33/10778* (2013.01)

(58) Field of Classification Search
CPC ... C01B 33/021; C01B 33/035; C01B 33/039; C01B 33/10763; C01B 33/10778
See application file for complete search history.

(56) References Cited

U.S. PATENT DOCUMENTS

| 3,020,128 A | 2/1962 | Adcock et al. |
| 3,540,861 A | 11/1970 | Bradley et al. |
| 2012/0177559 A1 | 7/2012 | Prine et al. |

*Primary Examiner* — Ngoc-Yen Nguyen
(74) *Attorney, Agent, or Firm* — Locke Lord LLP

(57) ABSTRACT

The present invention relates to an apparatus and a method for producing polycrystalline silicon having a reduced amount of boron compound impurities. Especially, the boron compounds are removed from the process for producing polycrystalline silicon, while the trichlorosilane is purified by distillation. The invention feeds condensed liquid trichlorosilane into a primary distillation tower below the liquid level inside the primary distillation tower thereby scrubbing the boron impurities upon contact inside the primary distillation tower. There result is trichlorosilane leaving the primary distillation tower with total amount of boron at least 10 times less.

3 Claims, 3 Drawing Sheets

PRIMARY DISTILLATION BORON REDUCTION

This Application is a Division of application Ser. No. 14/556,640 filed on Dec. 1, 2014. The entire contents of these applications are incorporated herein by reference in their entirety.

BACKGROUND OF THE INVENTION

Field of the Invention

The present invention relates to an apparatus and a method for producing polycrystalline silicon having a reduced amount of boron compound impurities. Especially, the boron compounds are removed from the process for producing polycrystalline silicon, while the trichlorosilane is purified by distillation.

Description of Related Art

Polycrystalline silicon is produced by the reaction of trichlorosilane and hydrogen gas, in a process known as the Siemens method. In the Siemens method, high-purity polycrystalline silicon deposits on polycrystalline silicon seed rods by hydrogen reduction of trichlorosilane shown by formula (1) and thermal decomposition of trichlorosilane shown by formula (2):

$$SiHCl_3 + H_2 \rightarrow Si + 3HCl \qquad (1)$$

$$4SiHCl_3 \rightarrow Si + 3SiCl_4 + 2H_2 \qquad (2).$$

Trichlorosilane ($SiHCl_3$, abbreviated "TCS", boiling point: 31.8° C.), used as a raw material for producing high purity polycrystalline silicon, is produced by reacting metallurgical grade silicon powder (abbreviated "Me-Si") of about 98% purity, which includes boron impurities, with hydrogen chloride gas (abbreviated "HCl"). Because other reactants are also produced in the reaction, a distillation process follows the reaction producing TCS.

Trichlorosilane is purified by a distilling process. However, it is very difficult to separate trichlorosilane and boron compounds, produced in the reaction, which have low boiling points like diborane ($B_2H_6$) (boiling point: −92.5° C.), boron trichloride ($BCl_3$) (boiling point: 12.4° C.), tetraborane ($B_4H_{10}$) (boiling point: 18° C.), etc., by commercial distillation processes, because the boiling point of many boron compounds are close to or lower than that of TCS. Boron is included in metallurgical grade silicon powder as an unavoidable impurity. Several different boron compounds are created in the Me-Si and HCl reaction.

Some methods for producing trichlorosilane are proposed for removing boron compounds, for example as disclosed in Japanese Unexamined Patent Application Publication No. 2005-67979. The application proposes a method in which an ether group is added to an unpurified chlorosilane, then the unpurified chlorosilane is distilled. However, ether group recovery followed by refining is necessary. Further, U.S. Pat. No. 4,713,230 proposes a process for purification of trichlorosilane in which the vapor phase trichlorosilane, contaminated with boron compounds, is passed through a bed of silica. But a fixed bed of silica is required to maintain the cleaning of the silica.

One object of this present invention is to provide an apparatus and a method for manufacturing polycrystalline silicon having a reduced amount of boron compounds.

SUMMARY OF THE INVENTION

This invention relates to an apparatus for producing polycrystalline silicon having a reduced amount of boron compounds, the apparatus has the following components: (A) a fluidized-bed reactor (chlorinator) for reacting metallurgical grade silicon with hydrogen chloride gas for producing TCS; (B) a condenser for condensing TCS and other compounds produced in the fluidized-bed reactor into a liquid; (C) a distillation unit for purifying the TCS wherein the liquid TCS and other compounds enters the distillation unit below a liquid level in the distillation unit; and (D) a reactor for polycrystalline silicon deposition on a surface of silicon seed rods.

This invention also relates to a method for producing polycrystalline silicon having a reduced amount of boron compounds, the method having the following steps: (A) reacting metallurgical grade silicon with hydrogen chloride to produce a reacted gas including TCS and other compounds, in a fluidized-bed reactor; (B) condensing the reacted gas, including TCS and other compounds, into a liquid; (C) feeding the liquid TCS and other compounds into a distillation unit below a liquid level inside the distillation unit; (D) distilling the TCS for purifying in a process; and (E) depositing polycrystalline silicon on silicon seed rods.

The apparatus of the present invention has a fluidized-bed reactor for reacting metallurgical grade silicon powders having more than 98 wt % purity with hydrogen chloride. Unpurified TCS is produced by the reaction at about 280° C. (536° F.) to about 320° C. (608° F.) in the fluidized-bed reactor. This temperature range is effective for stimulating a reaction between the metallurgical grade silicon powders and the hydrogen chloride gas to uniformly disperse hydrogen chloride gas in the fluidized-bed reactor. The unpurified TCS includes boron compounds, and is fed to a TCS tank after it is condensed.

The TCS tank is provided for collecting the TCS. It is possible to constantly feed the TCS to a distillation process. The TCS tank is connected to the distillation process by a TCS line.

The TCS is fed from the TCS tank to the distillation process, which comprises a plurality of distillation units. Each distillation unit has a distillation tower (or column), a condenser, a reboiler and a pump. Typically, a continuous fractional distillation is used as a distillation tower. Next, in the first distilling process, a distillation temperature at a top of a first distillation column is set between about a boiling point of trichlorosilane and about a boiling point of silicon tetrachloride, so that trichlorosilane is vaporized and separated as a vapor fraction. More specifically, the temperature at the top of the first distillation column, at 96 kPa (gauge pressure), is set between about 46° C. (115° F.) and about 56° C. (133° F.). Boron compounds having a high boiling point, silicon tetrachloride ($SiCl_4$, abbreviated "STC", boiling point: 57.6° C.), polymer and a small amount of TCS as "bottoms", are separated in the distillation process. The vapor distillates, or vapor fractions, from the process include boron compounds having a low boiling point or low boiling temperature, TCS, and a small amount of dichlorosilane (abbreviated "DCS", boiling point: 8.4° C.).

The vapor fraction is fed to a condenser and is condensed to liquid. The condenser has a vent gas line; and a pressure independent control valve (hereinafter called "PIC-V") are located in the vent gas line. In the present invention, low boiling point boron compounds, such as diborane ($B_2H_6$), boron trichloride ($BCl_3$), tetraborane ($B_4H_{10}$), remain in a gaseous state in the condenser and are discharged out of the process through the vent gas line. The condensed TCS is refluxed to the distillation tower by a pump. A part of the condensed TCS is fed to another or the next distillation tower and distillation is repeated in the next distillation unit.

Residue fractions are fed from a bottom of the distillation tower to a reboiler. The residue fractions are heated and a stream of the residue fractions is fed back to the distillation tower. Liquid of the residue fractions which include high boiling point boron compounds, such as pentaborane ($B_5H_9$), pentaborane ($B_5H_{11}$), diboron tetrachloride ($B_2Cl_4$), hexaborane ($B_6H_{10}$), and decaborane ($B_{10}H_{14}$), is discharged from the reboiler.

After that, in the second distilling process, a distillation temperature at a top of a distillation column is set between about a boiling point of dichlorosilane and about the boiling point of trichlorosilane. Preferably, the temperature at a top of a second distillation column is set between about 50° C. (122° F.) and about 60° C. (140° F.), at 125 kPa (gauge pressure). Pure trichlorosilane is separated from the first vapor fractions by distillation. Boron compounds having a low boiling point, DCS and a little TCS are separated as second vapor distillates.

The process is repeated in additional distillation towers/columns.

The TCS is purified by the above-mentioned distillation process. The purified TCS is fed to a reactor for depositing polycrystalline silicon on polycrystalline silicon seed rods.

This invention provides an apparatus and a method, which removes boron compounds from the TCS in the distillation process, and which produces polycrystalline silicon having a reduced amount of boron.

DETAILED DESCRIPTION OF THE INVENTION

Figure 1:
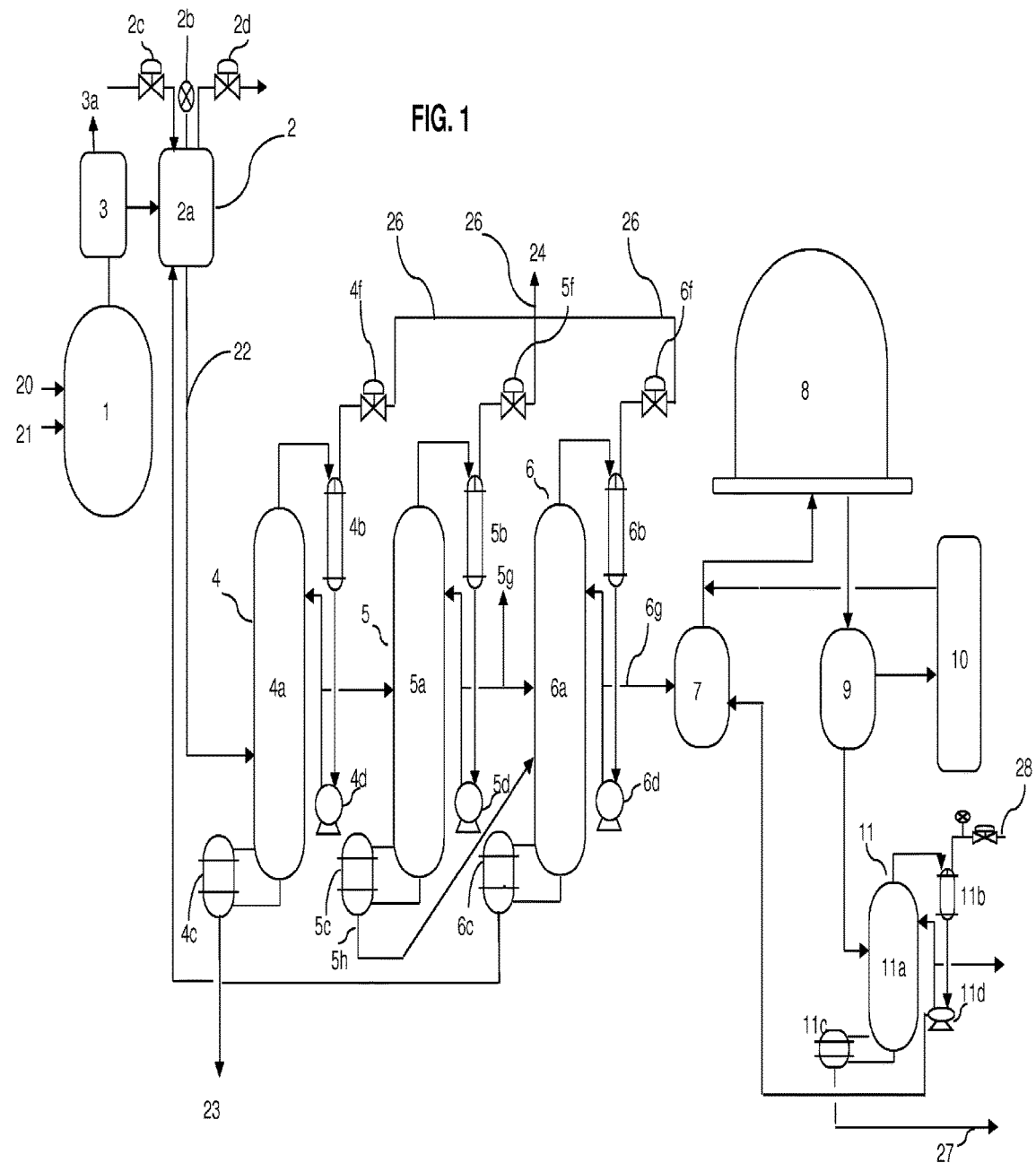
FIG. 1 is a process flow diagram illustrating an embodiment of the invention.

FIG. 1 shows an overall process flow of this invention. This invention comprises a fluidized-bed reactor 1, a TCS tank unit 2, distillation units 4-6, a vaporizer 7, a reactor 8, a condenser 9, a hydrogen recovery process 10 and a distillation unit 11 for the condensate of the condenser 9.

The fluidized-bed reactor 1 is for reacting metallurgical grade silicon powder (Me-Si) 20 of about 98% purity with hydrogen chloride (HCl) gas 21, based on reaction formula (3):

$$Me\text{-}Si + 3HCl \rightarrow SiHCl_3 + H_2 \qquad (3).$$

As a result of the Me-Si and HCl reaction, a reaction gas is produced in the fluidized-bed reactor 1. The reaction gas includes TCS, STC, DCS and boron compounds. The typical yield of reactants after chlorination process in the fluidized-bed reactor is approximately the following: TCS at 88 wt %, STC at 11.5 wt %, DCS at 0.5 wt % and boron at 3,000 to 6,000 ppbwt. More specifically, TCS is included at more than 80 wt %. In this embodiment, a fluidized-bed type reactor is used. The metallurgical grade silicon powder 20 is continuously fed to the fluidized-bed reactor 1. The hydrogen chloride gas 21 is fed to the fluidized-bed reactor 1 and is reacted with the metallurgical grade silicon powder 20 while the hydrogen chloride gas 21 passes through the metallurgical grade silicon powder 20. A bed temperature of the fluidized-bed reactor 1 is set between about 280° C. and about 320° C. This range of temperature is selected for producing TCS effectively. Temperatures especially over 320° C. (608° F.) are not favorable for creating a ratio of TCS. The reacted gas and unreacted gas are discharged from the fluidized-bed reactor 1.

The reacted gas with the unreacted gas is fed to a washtower (not shown) and condensing unit 3 for making a condensate including TCS. Unreacted hydrogen chloride gas and hydrogen gas are removed from this process as vent gases 3a. The condensate including TCS is fed to the TCS tank 2. A purpose of the TCS tank 2 is to feed TCS to the distillation process constantly at a flow rate between about $1.2 \times 10^{-3}$ m³/s to about $2.0 \times 10^{-3}$ m³/s in/s this embodiment. An atmosphere in the TCS tank 2 is changed by an inert gas, like He, $N_2$, Ar gas, etc. and is maintained at a uniform pressure by a pressure independent control valve 2c and a pressure independent control valve 2d, which are connected with a pressure transducer 2b. The TCS tank 2 is connected to a distillation unit 4 by a TCS line 22.

Each distillation unit 4-6 has a distillation tower 4a-6a, a condenser 4b-6b, a pump 4d-6d, and a reboiler 4c-6c, respectively. A continuous and fractional type distillation is used as distillation tower 4a-6a. A distillation temperature at a top of the distillation tower 4a-6a is set in a range between about the boiling point of TCS and about the boiling point of tetrachlorosilane, so that TCS is vaporized and separated as a vapor fraction. More specifically, the temperature at the top of the first or primary distillation tower 4a, at 80 kPa (gauge pressure), is set between about 45° C. (113° F.) and about 55° C. (131° F.). The temperature at the top of the distillation tower is controlled by a ratio of reflux of vapor fraction and a temperature of the reboiler.

The vapor fraction is fed to the condenser 4b-6b and is condensed to liquid in the condenser 4b-6b, respectively. The condenser has a vent gas line 26, and PIC-V 4f-6f valves are located on the vent gas line 26. When the pressure inside of the condenser exceeds a preset pressure, the PIC-V is opened so that the pressure inside of the condenser is maintained at a constant pressure. Vent gases 24 are discharged from the condenser 4b-6b out of the process. Typically vent gases 24 are continuously discharged. These vent gases include inert gas and various low boiling point boron compounds, such as diborane ($B_2H_6$), boron trichloride ($BCl_3$), tetraborane ($B_4H_{10}$). Therefore, the low boiling point boron compounds are discharged with the inert gas from the distillation unit. The condensed TCS is refluxed to the distillation towers 4a-6a by the pump 4d-6d, respectively. A part of the condensed TCS can be fed to a next distillation tower and distillation is repeated depending on the number of distillation towers/columns. Ultimately, a purified and condensed TCS is fed to the vaporizer 7 via line 6g.

In the embodiment in FIG. 1, part of the condensed TCS from condenser 5b is not sent to the next distillation tower 6a, but is instead cut and separated via line 5g. Instead, the bottoms of reboiler 5c is removed and sent to the next distillation tower 6a via line 5h.

In the embodiment in FIG. 1, the distillation towers are arranged in order of the process flow from chlorinator, fluidized bed reactor 1, to reactor 8 as follows: first or primary distillation unit 4, secondary distillation unit 5 and tertiary distillation unit 6. The distillation towers are primary distillation tower 4a, secondary distillation tower 5a and tertiary distillation tower 6a. In the case of the primary distillation tower 4a shown in FIG. 2, the TCS line 22 enters the primary distillation tower 4a below a liquid level 30 inside the primary distillation tower 4a. The feed stream of liquid TCS, STC, DCS and boron compounds now enters directly into the liquid section 31 of the primary distillation tower 4a, thus scrubbing more of the low boiling point boron compounds and discarding them into a waste stream or a bottoms 23 of the primary distillation tower 4a.

The result of the TCS line 22 entering the primary distillation tower 4a below the liquid level 30 inside the primary distillation tower 4a is a reduction of boron compounds in the discharge of primary distillation tower 4a leading to the condenser from an average of 400 ppm to an average of 40 ppm boron, measured in the condenser 4b. Boron is reduced by greater than 10 times, thus the discharge from the primary distillation tower 4a contains 10 times less boron content, as compared to the discharge of the typical primary distillation tower, where the TCS line enters the distillation tower in a vapor space 32 below distillation tower trays 33 (shown in FIG. 2) and above the liquid level 30 inside the distillation tower. By collecting more boron in bottoms 23, this may help to extend the life of the primary reboiler 4c connected to the primary distillation tower 4a.

In addition to the TCS line 22 entering the primary distillation tower 4a below the liquid level 30 inside the primary distillation tower 4a, also running the primary distillation tower 4a with a low reflux ratio, for example ≤5 gpm, contributes to keeping boron at the lowest possible level.

Residue fractions are removed from a bottom of the primary distillation tower 4a to the primary reboiler 4c. The residue fractions in primary distillation tower 4a are heated between about 77° C. (170° F.) to about 91° C. (195° F.) at 80 kPaG to 96 kPaG. Liquid of the residue fractions, which include a high boiling point boron compounds, such as pentaborane ($B_5H_9$), pentaborane ($B_5H_{11}$), diboron tetrachloride ($B_2Cl_4$), hexaborane ($B_6H_{10}$), and decaborane ($B_{10}H_{14}$), is discharged from the reboiler 4c as bottoms 23. A stream of the residue fractions of the reboiler 6c is fed back to the primary distillation tower 4a via the TCS tank 2a. In the distillation process, low boiling point boron compounds such as diborane ($B_2H_6$), boron trichloride ($BCl_3$), tetraborane ($B_4H_{10}$) are also removed from the secondary distillation tower 5a to the vent gas stream 26 and to the reflux cut stream 5g. Typical purified TCS is preferred to include no more than 0.030 ppbwt of boron compound.

In the vaporizer 7, the purified TCS is vaporized and the TCS gas and purified hydrogen are fed to the reactor 8 for producing polycrystalline silicon. A molar ratio of the purified TCS and the purified hydrogen gas is about 1:8, for example.

A plurality of silicon seed rods (not shown) stand in the reactor 8. The plurality of silicon seed rods are heated by resistance between about 1,000° C. (1,832° F.) to about 1,200° C. (2,192° F.). High-purity polycrystalline silicon deposits on the polycrystalline silicon seed rods by hydrogen reduction of TCS and thermal decomposition of TCS. Unreacted TCS gas, unreacted hydrogen gas and other generated chlorosilane gases are discharged from the reactor 8 and are fed to the condenser 9. The mixture of unreacted TCS gas and generated STC gas is condensed in the condenser 9 and is fed to distillation unit 11 for the separation of TCS and STC. The distillation unit 11 has a distillation tower 11a, a condenser 11b, a reboiler 11c and a pump 11d. Compounds remaining in a gaseous state in the condenser 11b are discharged out of the process through the vent gas line 28. Some of the condensed TCS is refluxed to the distillation tower 11a by the pump 11d and some of the separated TCS is fed back to the vaporizer 7 for recycle. Finally, some of the bottoms from reboiler 11c, particularly STC, is cut and discharged from the process via discharge line 27.

The unreacted hydrogen and other chlorosilanes stay in the gaseous state in the condenser 9 and are fed to a hydrogen recovery process 10 for purifying hydrogen gas. Pressure swing adsorption is applied to the hydrogen recovery process 10. Purified hydrogen gas is fed back to the reactor 8.

Figure 2:
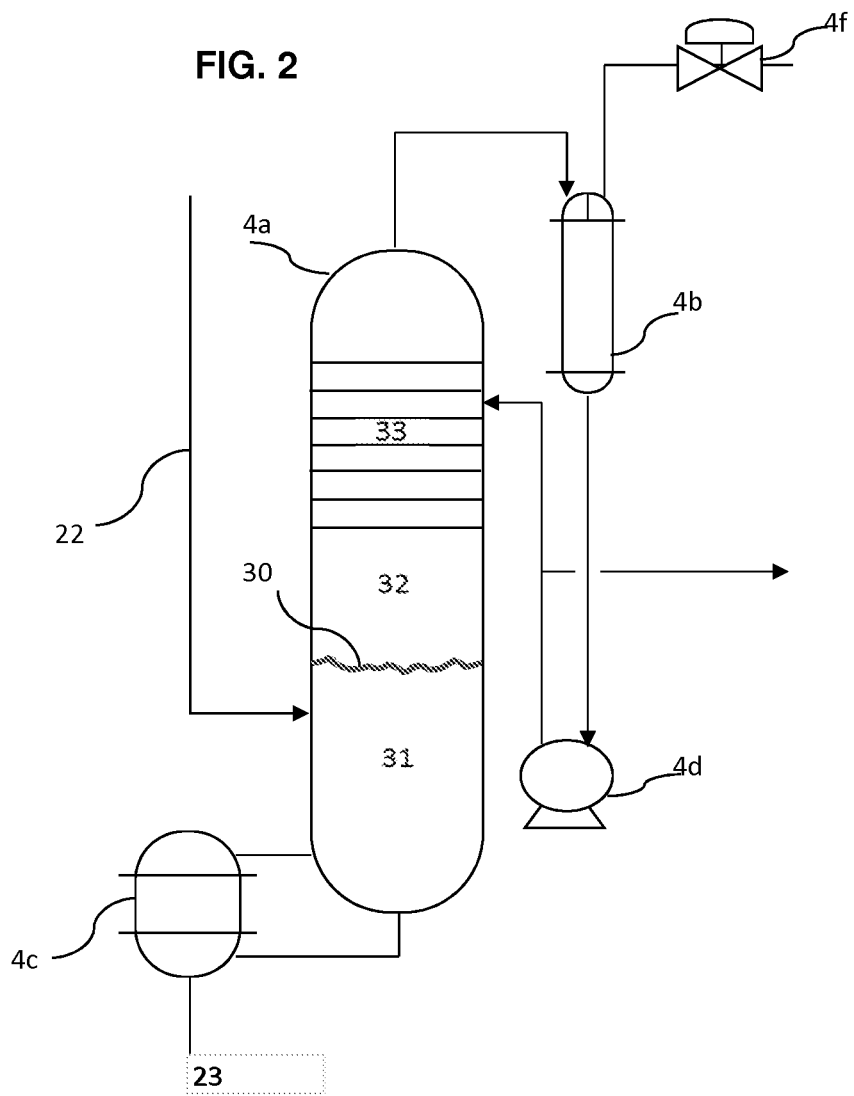
FIG. 2 is a diagram of a primary distillation tower.

In the embodiment shown in FIGS. 1 and 2, boron content in the discharge leading to the condenser 4b at the top of the primary distillation tower 4a was measured every day for 28 days. This was compared with the same measurements made for the same system except that the TCS line 22 entered the primary distillation tower 4a above the liquid level 30 in the vapor space 32 below the trays 33 in the distillation tower. The boron measurements of both systems are shown below:

| Day | TCS line to vapor space in primary distillation tower: Boron ppm | TCS line to liquid space in primary distillation tower: Boron ppm |
| --- | --- | --- |
| 1 | 400 | 17 |
| 2 | 569 | 32 |
| 3 | 356 | 24 |
| 4 | 537 | 24 |
| 5 | 401 | 33 |
| 6 | 286 | 31 |
| 7 | 448 | 7 |
| 8 | 618 | 23 |
| 9 | 498 | 56 |
| 10 | 379 | 25 |
| 11 | 333 | 29 |
| 12 | 392 | 19 |
| 13 | 454 | 45 |
| 14 | 405 | 28 |
| 15 | 358 | 37 |
| 16 | 481 | 37 |
| 17 | 359 | 31 |
| 18 | 365 | 72 |
| 19 | 355 | 17 |
| 20 | 358 | 65 |
| 21 | 388 | 27 |
| 22 | 435 | 30 |
| 23 | 306 | 33 |
| 24 | 395 | 24 |
| 25 | 577 | 14 |
| 26 | 519 | 18 |
| 27 | 276 | 24 |
| 28 | 430 | 17 |

Figure 3:
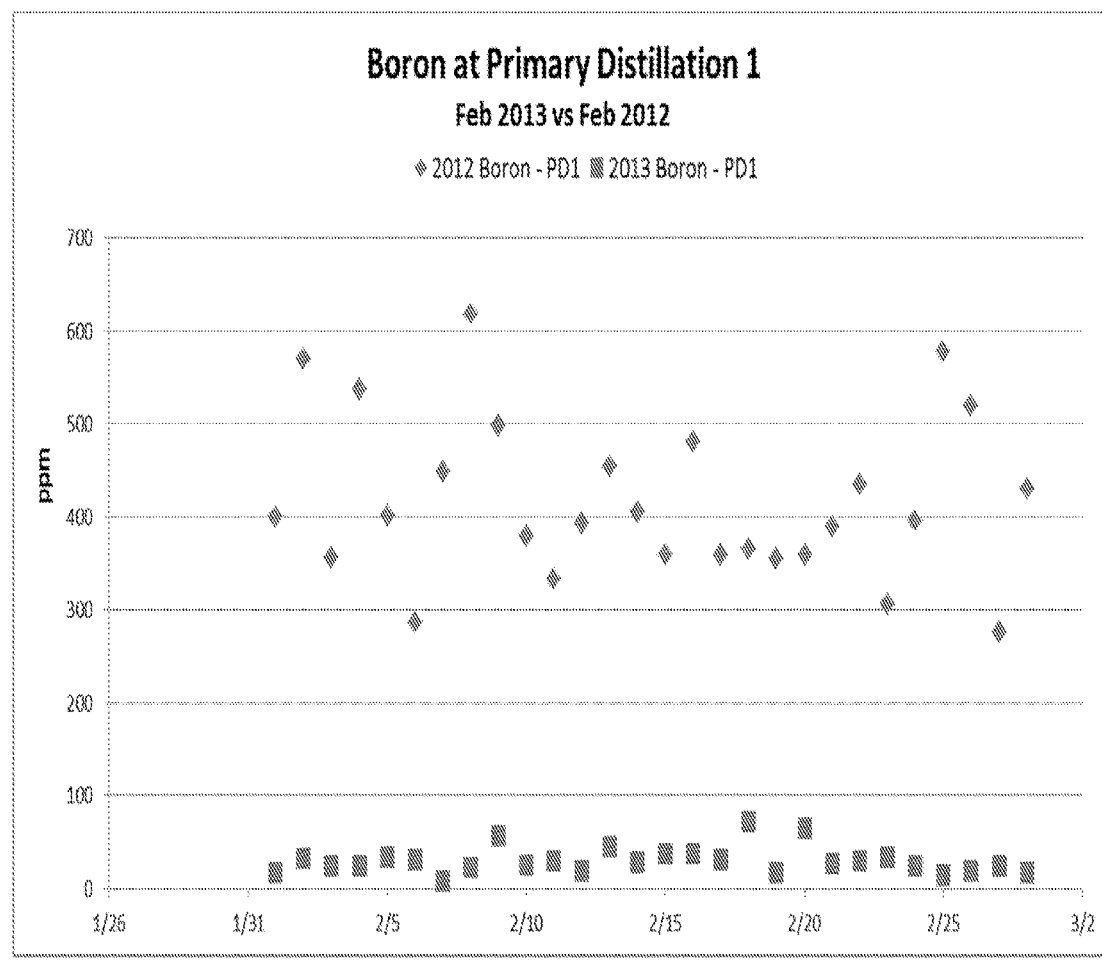
FIG. 3 is a graph showing boron reduction in a working example according to the invention.

FIG. 3 shows the graphical representation of these measurements with boron content plotted on the Y axis and the days plotted on the X axis.

The average amount of boron content measured over 28 days in the system where the TCS line entered the primary distillation tower above the liquid level in the vapor space below the trays was 417 ppm of boron. This compares with an average amount of 30 ppm of boron in the system of the invention where the TCS line 22 enters the primary distillation tower 4a below the liquid level 30 inside the primary distillation tower 4a. This is an average reduction of boron content of 13.9 times. This significant reduction results in higher purity of TCS and a more efficient distillation system.

In this invention, the distillation process comprises three distillation units 4-6. However, the number of distillation units is not limited, it is acceptable to modify the number of the distillation unit and type of distillation to the extent of the invention.

As shown in FIG. 1 the condensed TCS is refluxed to each of the distillation towers 4a-6a by the each of the pump 4d-6d, respectively. A part of the condensed TCS can be fed to a next distillation tower and distillation is repeated depending on the number of distillation towers/columns. In another embodiment, just as with the primary distillation tower 4a, the condensed TCS from each successive distillation column can be fed in a line which enters the next downstream distillation tower below a liquid level inside the next downstream distillation tower. The feed stream of liquid TCS and boron compounds, in this embodiment, now enters directly into the liquid section of all distillation towers, thus scrubbing more of the low boiling point boron compounds and discarding them into a waste stream of the distillation towers. Ultimately, a purified and condensed TCS is fed to the vaporizer 7 via line 6g.

The invention and embodiment are described for illustrative, but not limitative purposes. It is to be understood that changes and/or modifications can be made by those skilled in the art without for this departing from the related scope of protection, as defined by the enclosed claims.

What is claimed is:

1. A method for manufacturing polycrystalline silicon having a reduced amount of boron compounds, comprising:
    reacting metallurgical grade silicon with hydrogen chloride to produce a reacted gas, including trichlorosilane, boron compounds as impurities and other compounds, in a fluidized-bed reactor;
    condensing the reacted gas to form a liquid containing trichlorosilane, boron compounds as impurities and other compounds;
    feeding the liquid into a distillation unit below a liquid level inside the distillation unit;
    distilling the liquid to separate the trichlorosilane from other compounds and to remove boron compounds impurities; and
    using the trichlorosilane obtained from the distilling step to deposit polycrystalline silicon on silicon seed rods.

2. The method for manufacturing polycrystalline silicon having a reduced amount of boron compounds according to claim 1, wherein the distillation unit has a low reflux ratio of <5 gpm.

3. The method for manufacturing polycrystalline silicon having a reduced amount of boron compounds according to claim 1, wherein boron discharged from the distillation unit is less than about 40 ppm.

* * * * *